(12) United States Patent
Arlt et al.

(10) Patent No.: US 6,660,783 B2
(45) Date of Patent: Dec. 9, 2003

(54) PREPARATION OF HIGHLY RESILIENT POLYURETHANE FOAMS

(75) Inventors: Andreas Arlt, Drebber (DE); Klaus Wagner, Wagenfeld (DE); Volker Varenkamp, Stemshorn (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/161,900

(22) Filed: Jun. 4, 2002

(65) Prior Publication Data

US 2003/0036578 A1 Feb. 20, 2003

(30) Foreign Application Priority Data

Jun. 15, 2001 (DE) .......................................... 101 29 062

(51) Int. Cl.$^7$ ............................................... C08G 18/48
(52) U.S. Cl. ....................... 521/137; 521/115; 521/128; 521/129; 521/170; 521/174
(58) Field of Search ................................ 521/137, 170, 521/174, 115, 128, 129

(56) References Cited

U.S. PATENT DOCUMENTS

| | | | |
|---|---|---|---|
| 4,089,835 A | | 5/1978 | Kunig et al. |
| 5,506,278 A | * | 4/1996 | Walmsley .................... 521/128 |
| 5,549,841 A | * | 8/1996 | Kinkelaar et al. ..... 252/182.27 |
| 5,674,920 A | * | 10/1997 | Obata et al. ................. 521/159 |
| 5,718,856 A | | 2/1998 | Kinkelaar et al. |
| 5,877,227 A | * | 3/1999 | Murty ......................... 521/159 |
| 5,977,198 A | | 11/1999 | Hettel et al. |
| 6,068,790 A | | 5/2000 | Postema et al. |
| 6,087,410 A | | 7/2000 | Falke et al. |
| 6,228,899 B1 | | 5/2001 | Wetterling et al. |

FOREIGN PATENT DOCUMENTS

| | | |
|---|---|---|
| CA | 2037082 | 9/1991 |
| DE | 2513815 | 9/1976 |
| DE | 2519004 | 11/1976 |
| DE | 4007063 | 9/1991 |
| DE | 197 36 976 A1 | 3/1999 |
| EP | 0 731 120 A2 | 9/1996 |
| EP | 0 778 301 | 6/1997 |
| EP | 0 884 338 A1 | 12/1998 |
| EP | A 0 903 362 | 3/1999 |
| WO | WO 95/15990 | 6/2002 |

OTHER PUBLICATIONS

EPO Search Report (Aug. 2002).
Bryan D. Kaushiva; Journal of Applied Polymer Science (2000;) pp. 202–216; Blacksburg, VA 24061–0211.
Dimitrios V. Dounis; Journal of Applied Polymer Science (1997;) pp. 525–539; Blacksburg, VA 24061–0211.
R. Brasington; Handbook of the 35$^{th}$ Annual Polyurethane Mechnical/Marketing Conference (1994); pp. 261–266; Boston,MA.
R. Skorpenske; Handbook of the 34$^{th}$ Annual Polyurethane Technical/Marketing Conference; (1992) pp. 650–658; New Orleans, Louiiana.
R. Broos; Journal of Cellular Plastics (2000;) p. 5; Orlando, FL.

* cited by examiner

Primary Examiner—John M. Cooney, Jr.
(74) Attorney, Agent, or Firm—Fernando A. Borrego

(57) ABSTRACT

Highly resilient polyurethane foams are prepared by reacting
a) polyisocyanates with
b) compounds having at least two hydrogen atoms reactive with isocyanate groups,
by a process in which a mixture containing, based in each case on the weight of the mixture,
b1) from 5 to 75% by weight of at least one polymer polyol and
b2) from 25 to 95% by weight of a mixture containing, based in each case on the weight of the mixture b2),
b2i) from 70 to 98% by weight of at least one polyether alcohol having a molecular weight of from 3 500 to 6 500 g/mol, a functionality of less than or equal to 3 and an ethylene oxide content of from 8 to 20% by weight, based on the weight of the polyether alcohol, and
b2ii) from 2 to 30% by weight of at least one polyether alcohol having a molecular weight of from greater than 4 000 to 7 000 g/mol, a functionality of from 4 to 8 and an ethylene oxide content of from 5 to 15% by weight, based on the weight of the polyether alcohol,
is used as compounds b) having two hydrogen atoms reactive with isocyanate groups.

9 Claims, No Drawings

PREPARATION OF HIGHLY RESILIENT POLYURETHANE FOAMS

The present invention relates to a process for the preparation of highly resilient polyurethane foams.

Highly resilient polyurethane foams, frequently also referred to as HR foams, have long been known. They are generally prepared by reacting filler-containing polyols with isocyanates, in particular TDI, MDI or mixtures thereof, it also being possible to use modified isocyanates, in particular isocyanates containing urethane, urea, biuret and/or allophanate groups. Examples of filler-containing polyols used are:

a) Dispersions of homo- and/or copolymers of styrene and acrylonitrile in polyols, which are grafted with acrylonitrile and/or styrene (SAN polyols),
b) dispersions of polyurea particles in polyols, the polyurea particles being prepared by reacting diamines and diisocyanates in the presence of the polyol (PHD polyols),
c) dispersions of particles which are prepared by reacting alkanolamines and diisocyanates in polyols (PIPA polyols) or mixtures of at least two of said polyether alcohols.

In addition to these filler-containing polyols, alkanolamines are also generally used as crosslinking agents for the preparation of HR foams. The alkanolamines cause chemical crosslinking of the foam and are required for obtaining foams having sufficient stability. If no alkanolamines are used, the foam generally collapses or settles considerably since the cells are not sufficiently stabilized after the end of the polyisocyanate polyaddition reaction. In contrast to conventional foams, the physical stabilization in the case of HR foams is not sufficient at this time since special silicone stabilizers having comparatively low activity are used for the preparation of HR foams. If, on the other hand, more active stabilizers, as used for the preparation of conventional slabstock foams, are employed, the HR foams, owing to the generally higher crosslinking density, tend to form closed-cell foams, which leads to shrinkage of the foams in the cooling phase.

However, the use of the alkanolamine crosslinking agents is also associated with some changes in the mechanical properties of the foams and thus also disadvantages, so that their content in the foam system must as far as possible be limited.

Thus, it is known from the literature that the addition of alkanolamines, for example diethanolamine, leads to an increase in the crosslinking density of the foam since the diethanolamine molecules are covalently incorporated into the hard phase segments of the foam matrix. This is described, for example, in Dimitros, Wilkes: Journal of Applied Polymer Science 77 (2000), 202–216, and Dounis, Wilkes: Journal of Applied Polymer Science 65 (1997), 525–539.

The incorporation of the diethanolamine molecules into the hard segments leads to a disturbance of the hard phase order by reducing the proportion of intermolecular hydrogen bridge bonds between the urea units in the hard segments. However, these hydrogen bridges are essential for the occurrence of crystalline structures which give the foam its typical rigidity. Since the proportion of hydrogen bridges and hence the proportion of crystalline units in the hard segments are reduced, a reduction in the rigidity of the foams occurs in conventional HR foams as a result of the addition of alkanolamine crosslinking agents. However, the disturbance of the hard segments in the HR foam also has advantages. In the case of the deformation of the foams by the action of force, the hydrogen bridges are broken at a specific force. During the subsequent relief, the hydrogen bridge bonds must form again. This recovery phase lasts longer the larger and more undisturbed the hard phase segments. Consequently, the area between loading curve and relief curve, i.e. the hysteresis, becomes larger, which manifests itself in lower resilience. Diethanolamine disturbs the formation of longer and ordered hard segments, so that fewer hydrogen bridges can form. Consequently, the recovery phase is shorter and the hysteresis smaller.

Furthermore, it is known that the resilience of HR foams increases with increasing rigidity. In principle, the reduction in rigidity is undesirable in many cases. Highly resilient foams tend as a rule to be formulated to be rigid in order to meet the high requirements with respect to the comfort properties, for example high resilience. One criterion which the foams should fulfill is the SAG factor, the quotient of the indentation hardness at 65% deformation and the indentation hardness at 25% deformation (method B). The SAG factor should be >2.5, preferably >3. Furthermore, the disturbance of the hard phase order and hence of the intermolecular hydrogen bridges by alkanolamine crosslinking agents also leads to lower stability of the foams to the action of heat and moisture, since the domains are more labile and hence more mobile. The alkanolamine crosslinking agents are incorporated into the polyurethane hard segments via urethane and urea groups. These additional urethane and urea groups in the hard segments permit the formation of hydrogen bridge bonds to penetrating water molecules, whereas this is not possible in hard segments without alkanolamine since here the urea bonds interact with one another to form crystalline hard segments via hydrogen bridges so that no additional hydrogen bridges to water molecules can be formed. The adverse effect of the penetrated water in the hard segments is evident, for example, in the substantial deterioration in the mechanical properties under or after the action of moisture. In particular, the wet compression set (WCS), a compression set measurement under climatically controlled conditions, the humid aged compression set (HACS), a compression set measurement after exposure to a humid warm atmosphere, are frequently too high in the case of HR foams. The WCS in particular is an important quality criterion for HR foams when used as mattresses and upholstery materials. In addition to the compression set, the rigidity, tensile strength and elongation under the action of heat and moisture also should not deteriorate.

A number of possibilities for improving the WCS of HR foams are known from the prior art. One possibility is the heat treatment of the foams after their preparation is complete. This postcuring at 120° C. is described, for example, by Brasington and Lambach (Handbook of the 35th Annual Polyurethane Technical/Marketing Conference, 1994, pages 261–266) and by Skorpenske et al. (Handbook of the 34th Annual Polyurethane Technical/Marketing Conference, 1992, pages 650–658) and Broos et al. (Journal of Cellular Plastics 36 (2000), 5). The disadvantage of this process is that, after the preparation, the foam has to be subjected to a further processing step in which the action of heat can result in impairment of the mechanical properties, such as the tensile strength and elongation.

According to EP-A-0 903 362, low molecular weight chain extenders or crosslinking agents are used for the preparation of polyurethane foams having improved rigidity and higher stability in a humid and warm atmosphere, for example glycerol, trimethylolpropane, sorbitol or ethylene oxide-rich adducts of these compounds. Owing to their high OH numbers of 400–700 mg KOH/g, these compounds are too reactive for use in HR slabstock foams since the other polyols used for the preparation of these foams already have very high reactivity, so that closed foams tending to shrink result when the claimed low molecular weight crosslinking agents are used.

EP A-731 120 claims a process for the preparation of highly resilient foams using filler-free polyols. A mixture of a polyol having a relatively high functionality and an ethylene oxide content of 10–30% by weight and a highly reactive polyol having predominantly primary OH groups and an ethylene oxide content of 50–95% is used as filler-free polyols. The disadvantage of this type of mixture is the very low elongation at break, owing to the high reactivity and the high functionality of the polyols and hence the high degree of crosslinking of the foam. The high content of ethylene oxide in the highly reactive polyol furthermore leads to a pronounced hydrophilic character of the foams, which adversely affects their aging resistance.

EP-A-884 338 describes a process for the preparation of resilient foams having latex-like properties, low compression set and better humid aging resistance using a combination of polyether polyols having a relatively high functionality of from 4 to 8 and polymer polyols. The polyols having a relatively high functionality are prepared by an addition reaction of alkylene oxides with initiators having a relatively high functionality, such as sorbitol, mannitol or sucrose, alone or in combination with initiators such as ethylene glycol, propylene glycol, glycerol, trimethylolpropane or pentaerythritol. By using this polyol component, it was intended to reduce the filler content in the polymer polyol without there being any reduction in the rigidity of the foam. Through the use of the polyol having a relatively high functionality in combination with the polymer polyol, in general a very high crosslinking density is achieved, which leads to poor tensile properties, in particular lower elongation at break of the foams.

DE 19736976 describes a process for the preparation of foams having improved properties, in particular having a lower compression set and higher rigidity and tensile strength, with addition of polyether polyols having a relatively high functionality and glycerol as crosslinker components. The polyols having a relatively high functionality are prepared by an addition reaction of alkylene oxides with a mixture of initiators having a relatively high functionality, such as sorbitol or sucrose, and alkylene glycols having hydroxyl functional groups and containing 2 or 3 active hydrogen atoms. Compared with a foam without a polyol having a relatively high functionality, the foams indicated in the examples do not have a significantly reduced compression set also at a high level. The use of glycerol as a crosslinker component and the high content of highly functional polyether alcohol result in a very high crosslinking density of the foams described. With the use of glycerol in the preparation of HR foams, in particular HR slabstock foams, process engineering problems are encountered.

U.S. Pat. No. 5,718,856 claims mixtures of polyols having a relatively high nominal functionality of at least 6 and polymer polyols having a relatively high nominal functionality of at least 5.5 for reducing the wet compression set in molded HR foams. The preparation of polyols having such high functionalities is technologically difficult, is possible only via prepolymers and is therefore expensive. Owing to their high functionality, such polyols generally have a high viscosity and for this reason are difficult to process.

WO 95/15990 describes the use of a polyol component comprising a very high proportion of highly functional, in particular hexafunctional, polyols and a very low proportion of a polyol having an ethylene oxide content of at least 30% by weight for highly resilient foams. The possibility of using high contents of alkanolamine in the foam composition, which is intended to lead to better flameproof properties of the foams, is mentioned as an advantage of this polyol composition. Up to 5% by weight of diethanolamine are used as a crosslinking agent. However, the use of such large amounts of alkanolamine is associated with the disadvantages described.

It is an object of the present invention to prepare highly resilient polyurethane foams, in particular highly resilient flexible polyurethane slabstock foams, having improved aging resistance to heat and moisture, in particular improved wet compression set (WCS) and humid aged compression set (HACS), and sufficient rigidity. Very small amounts of alkanolamine crosslinking agents should be used.

We have found that this object is achieved and that, surprisingly, the content of alkanolamine in the foam formulations can be substantially reduced without the properties of the foams being impaired if a mixture of polymer polyols, high molecular weight polyols having a relatively high functionality and high molecular weight polyols having a low functionality is used for the preparation of the highly resilient foams.

The present invention relates to a process for the preparation of highly resilient polyurethane foams by reacting
a) polyisocyanates with
b) compounds having at least two hydrogen atoms reactive with isocyanate groups,
wherein a mixture containing, based in each case on the weight of the mixture,
b1) from 5 to 75% by weight of at least one polymer polyol and
b2) from 25 to 95% by weight of a mixture containing, based in each case on the weight of the mixture b2),
b2i) from 70 to 98% by weight of at least one polyether alcohol having a molecular weight of from 3 500 to 6 500 g/mol, a functionality of less than or equal to 3, preferably from 2 to 3, an ethylene oxide content of from 8 to 20% by weight, based on the weight of the polyether alcohol, and
b2ii) from 2 to 30% by weight of at least one polyether alcohol having a molecular weight of from greater than 4 000 to 7 000 g/mol, a functionality of from 4 to 8 and an ethylene oxide content of from 5 to 15% by weight, based on the weight of the polyether alcohol,
is used as compounds b) having two hydrogen atoms reactive with isocyanate groups.

Preferably, the reaction mixture also contains alkanolamines as crosslinking agents. These are used in an amount of from 0.2 to 2.0, preferably from 0.2 to 1.0, % by weight, based in each case on the weight of the component b). Examples of alkanolamines are diethanolamine, diisopropanolamine, 3-(2-hydroxyethylamino)-1-propanol, N-(2-aminoethyl)ethanolamine, triisopropanolamine and triethanolamine. In addition to alkanolamines, glycerol and trimethylolpropane and/or polyfunctional amines, such as diethylenetriamine, 3-(2-aminoethyl)aminopropylamine and/or dipropylenetriamine, may also be used, in an amount of from 0.2 to 3.0% by weight, based on the weight of the component b) as crosslinking agent.

The polymer polyols are preferably selected from the group consisting of
b1i) dispersions of homo- and/or copolymers of styrene and acrylonitrile in polyols (SAN polyols), prepared by in situ copolymerization of acrylonitrile and/or styrene in carrier polyols of the type b2i), having a solids content of from 35 to 55% by weight and an OH number of from 15 to 25 mg KOH/g.

b1ii) Dispersions of polyurea particles in polyols, the polyurea particles being produced by reacting diamines and diisocyanates in the polyols (PHD polyols), as described, for example, in DE 2519004, DE 2513815 and DE 4007063.

b1iii) Dispersions of particles which are prepared by reacting alkanolamines with diisocyanates in polyols (PIPA polyols).

These products are generally known and commercially available.

The polyether alcohols b2i) are preferably, as mentioned, reactive polyether alcohols having a molecular weight of from 3 500 to 6 500, preferably from 4 000 to 6 000, g/mol, prepared by an addition reaction of alkylene oxides with difunctional or trifunctional initiators, such as glycerol or trimethylolpropane, the ethylene oxide preferably undergoing addition at the chain end.

The polyether alcohols b2ii) have, as mentioned, a molecular weight of from 4 000 to 7 000 g/mol, a functionality of from 4 to 8, primary OH groups and an ethylene oxide content of from 5 to 15, preferably $\leq 9$, % by weight, preferably at least some of the ethylene oxide used undergoing addition at the chain end. Owing to the primary OH groups formed thereby, these polyether alcohols are particularly suitable for the preparation of HR foams. When these polyether alcohols are used, there is no significant deterioration in the properties of the foams, as is frequently observed with the use of low molecular weight crosslinking agents.

Initiator molecules used for the preparation of the polyether alcohols b2ii) are compounds having at least 4 active hydrogen atoms, for example sorbitol, mannitol, sucrose, xylitol, maltitol, maltose, lactose and fructose, preferably sorbitol and sucrose. These compounds can be reacted as initiator molecules alone or as a mixture with compounds having a functionality of <4, for example ethylene glycol, propylene glycol, glycerol, trimethylolpropane or pentaerythritol, with alkylene oxides, generally propylene oxide and/or ethylene oxide. The amount of the compounds having a functionality of $\leq 4$ is such that the average functionality of the resulting polyether alcohols is at least 4.

In a particularly advantageous embodiment of the polyether alcohols b2ii), the compounds having at least 4 active hydrogen atoms are reacted, together with aliphatic, araliphatic and/or aromatic amines having at least two reactive hydrogen atoms, with the alkylene oxides. Aliphatic amines having from 2 to 8, preferably from 2 to 5, carbon atoms and 1 or 2, preferably 2, primary amino groups are preferably used. Preferred amines are ethylenediamine and propylenediamine.

The use of initiator mixtures containing primary and/or secondary amines for the preparation of polyether alcohols b2ii) has advantages. Thus, by using such initiator mixtures, it is possible to prepare polyols having catalytic activity, since secondary and/or tertiary amino groups are produced in the polyol molecule by reacting the primary and secondary amine with alkylene oxides. These secondary and/or tertiary amino groups serve as catalytically active centers, so that the resulting polyols are capable of activating the polyisocyanate polyaddition reaction. As a result of this additional catalytic action of the polyols used, it is possible to reduce the proportion of the volatile activators usually used, for example triethylenediamine or dimethylaminoethyl ether, which are used for the preparation of polyurethane foams. This is of considerable importance in particular for meeting the increasingly high requirements for small amounts of volatile components in polyurethane foams.

The polyether alcohols b2ii) lead to an increase in the degree of crosslinking and hence in the rigidity of the foam. It was found that the use of the polyether alcohols b2ii) leads to a significant improvement in the stability of the foams to moisture and heat, in particular to a significant improvement in the wet compression set and in the humid aged compression set (HACS), the compression set after storage in a humid warm atmosphere.

By using polyether alcohols b2ii) having a relatively high functionality, the proportion of alkanolamine crosslinking agents can be substantially reduced, preferably to a content of less than 1.5, in particular from 0.2 to 1.0, % by weight, based in each case on the weight of the component b), without this leading to a deterioration in the stability of the foams, which may be evident, for example, from considerable settling of the foams up to collapse. The reduction in the proportion of alkanolamine crosslinking agents is, as described above, desirable. Thus, as a result of their incorporation, alkanolamine crosslinking agents lead to a disturbance of the order of the hard segments, which is associated with the disadvantages described above, in particular a significant increase in the wet compression set. In addition, bond cleavages are increased by alkanolamines since, after their incorporation into the hard segments, they have catalytically active tertiary N centers. This breaking of bonds through hydrolytic cleavage is responsible to a decisive extent for the decline in the mechanical properties.

Regarding the further starting compounds used for the novel process, the following may be stated specifically:

All isocyanates having two or more isocyanate groups in the molecule are used as polyisocyanates a) for the novel process. Both aliphatic isocyanates, such as hexamethylene diisocyanate (HDI) or isophorone diisocyanate (IPDI), and preferably aromatic isocyanates, such as tolylene diisocyanate (TDI), diphenylmethane diisocyanate (MDI) or mixtures of diphenylmethane diisocyanate and polymethylenepolyphenylene polyisocyanates (crude MDI), preferably TDI and MDI, particularly preferably TDI, may be used. It is also possible to use isocyanates which were modified by the incorporation of urethane, uretdione, isocyanurate, allophanate, uretonimine and other groups, i.e. modified isocyanates. Preferred prepolymers are MDI prepolymers having an NCO content of from 20 to 35% and their mixtures with polymethylenepolyphenylene polyisocyanates (crude MDI).

The novel process is generally carried out in the presence of catalysts, for example tertiary amines or organic metal compounds, in particular tin compounds. Preferably used tin catalysts are divalent tin salts of fatty acids, such as tin dioctanoate, and organotin compounds, such as dibutyltin dilaurate.

The reaction is carried out in the presence or absence of assistants and/or additives, such as fillers, cell regulators, surface active compounds and/or flameproofing agents. Preferred flameproofing agents are liquid halogen-phosphorus-based flameproofing agents, such as trichloropropyl phosphate or trichloroethyl phosphate.

Further information on the starting materials, catalysts and assistants and additives used is to be found, for example, in Kunststoff-Handbuch, Volume 7, Polyurethane, Carl-Hanser-Verlag Munich, 1st Edition, 1966, 2nd Edition, 1983 and 3rd Edition, 1993.

For the preparation of the novel polyurethanes, the organic polyisocyanates are reacted with the compounds having at least two active hydrogen atoms in the presence of said blowing agents, catalysts and assistants and/or additives.

In the preparation of the novel polyurethanes, the isocyanate and the polyol component are generally combined in an amount such that the ratio of the number of equivalents of isocyanate groups to the sum of the active hydrogen atoms is from 1:0.7 to 1:1.25, preferably from 1:0.8 to 1:1.2.

The preparation of the polyurethane foams is preferably carried out by the one-shot process, for example with the aid of the high pressure or low pressure technique. The foams can be prepared in open or closed metallic molds or by continuous application of the reaction mixture to belt lines for the production of slabstock foam.

It is particularly advantageous to employ the two-component process in which, as stated above, a polyol component and an isocyanate component are prepared and foamed. The components are preferably mixed at from 15 to 90° C., especially from 20 to 60° C., particularly preferably from 20 to 35° C., and are introduced into the mold or onto the belt line. The temperature in the mold is in general from 20 to 110° C., preferably from 30 to 60° C., particularly preferably from 35 to 55° C.

The highly resilient polyurethane foams prepared by the novel process have good rigidity properties and high stability to moisture and heat. The lower HACS and WCS values of the foams prepared by the novel process are particularly advantageous. The wet compression set according to DIN EN ISO 1856, Method C, is generally <20%, preferably <15%. The HACS value according to DIN EN ISO 1856, Method A, is in general less than 15%, preferably <10%.

The examples which follow illustrate the invention.

EXAMPLES 1 TO 21

Description of the Polyther Polyols Used

Polymer Polyols b1):

Lupranol® 4300 (BASF AG): SAN polymer polyol, prepared by in situ polymerization of styrene and acrylonitrile in the ratio 1:1 in a carrier polyol of the type b2i) (Pluracol® 538), having an SAN content of 50% and an OH number of 17.5 mg KOH/g.

Lupranol® 4800 (BASF AG): SAN polymer polyol, prepared by in situ polymerization of styrene and acrylonitrile in the ratio 1:2 in a carrier polyol of the type b2i) (Lupranol® 2095), having an SAN content of 45% and an OH number of 20.0 mg KOH/g.

Polyols b2i):

Lupranol® 2095 (BASF AG): Polyether polyol having an OH number of 35 mg KOH/g, prepared by an addition reaction of propylene oxide and ethylene oxide with glycerol as an initiator molecule, having a content of 13.3% by weight of ethylene oxide as a terminal EO block and a nominal functionality of 2.72.

Polyols b2ii):

b2ii)1: Polyether polyol having an OH number of 42 mg KOH/g, prepared by an addition reaction of propylene oxide and ethylene oxide with sorbitol as an initiator molecule, having a content of 10% by weight of ethylene oxide as a terminal EO block and a nominal functionality of 4.3.

b2ii)2: Polyether polyol having an OH number of 38 mg KOH/g, prepared by an addition reaction of propylene oxide and ethylene oxide with a mixture of ethylenediamine and sorbitol as initiator molecules, having a content of 9% by weight of ethylene oxide as a terminal EO block and a nominal functionality of 4.5.

b2ii)3: Polyether polyol having an OH number of 36 mg KOH/g, prepared by an addition reaction of propylene oxide and ethylene oxide with a mixture of ethylenediamine and sorbitol as initiator molecules, having a content of 15% by weight of ethylene oxide as a terminal EO block and a nominal functionality of 4.5.

b2ii)4: Polyether polyol having an OH number of 37 mg KOH/g, prepared by an addition reaction of propylene oxide and ethylene oxide with a mixture of ethylenediamine and sorbitol as initiator molecules, having a content of 9% by weight of ethylene oxide as a terminal EO block and a nominal functionality of 5.2.

b2ii)5: Polyether polyol having an OH number of 37 mg KOH/g, prepared by an addition reaction of propylene oxide and ethylene oxide with a mixture of ethylenediamine and sorbitol as initiator molecules, having a content of 15% by weight of ethylene oxide as a terminal EO block and a nominal functionality of 5.2.

b2ii)6: Polyether polyol having an OH number of 34 mg KOH/g, prepared by an addition reaction of propylene oxide and ethylene oxide with sorbitol as an initiator molecule, having a content of 9% by weight of ethylene oxide as a terminal EO block and a nominal functionality of 6.0.

b2ii)7: Polyether polyol having an OH number of 38 mg KOH/g, prepared by an addition reaction of propylene oxide and ethylene oxide with a mixture of ethylenediamine and sucrose as initiator molecules, having a content of 9% by weight of ethylene oxide as a terminal EO block and a nominal functionality of 6.0.

b2ii)8: Polyether polyol having an OH number of 33 mg KOH/g, prepared by an addition reaction of propylene oxide and ethylene oxide with a mixture of ethylenediamine and sucrose as initiator molecules, having a content of 15% by weight of ethylene oxide as a terminal EO block and a nominal functionality of 6.0.

The following compounds are reacted with one another under the usual conditions of foam preparation by the one-shot process:

TABLE 1

| Example | 1(C) | 2 | 3 | 4 | 5 | 6 | 7 | 8 | 9 |
|---|---|---|---|---|---|---|---|---|---|
| Lupranol 4800 | 35.00 | 35 | 35 | 35 | 35 | 35 | 35 | 35 | 35 |
| Lupranol 2095 | 65.00 | 55 | 55 | 55 | 55 | 55 | 55 | 55 | 55 |
| Polyol b2ii)1 | | 10 | | | | | | | |
| Polyol b2ii)2 | | | 10 | | | | | | |
| Polyol b2ii)3 | | | | 10 | | | | | |
| Polyol b2ii)4 | | | | | 10 | | | | |
| Polyol b2ii)5 | | | | | | 10 | | | |
| Polyol b2ii)6 | | | | | | | 10 | | |
| Polyol b2ii)7 | | | | | | | | 10 | |
| Polyol b2ii)8 | | | | | | | | | 10 |
| DEOA 85% | 1.40 | 0.80 | 0.80 | 0.80 | 0.80 | 0.80 | 0.80 | 0.80 | 0.80 |
| Water | 2.10 | 2.18 | 2.18 | 2.18 | 2.18 | 2.18 | 2.18 | 2.18 | 2.18 |
| Tegostab B 8681 LF (Goldschmidt) | 0.80 | 0.80 | 0.80 | 0.80 | 0.80 | 0.80 | 0.80 | 0.80 | 0.80 |

TABLE 1-continued

| Example | 1(C) | 2 | 3 | 4 | 5 | 6 | 7 | 8 | 9 |
|---|---|---|---|---|---|---|---|---|---|
| Lupragen N 201 (BASF AG) | 0.12 | 0.12 | 0.12 | 0.12 | 0.12 | 0.12 | 0.12 | 0.12 | 0.12 |
| Lupragen N 206 (BASF AG) | 0.04 | 0.04 | 0.04 | 0.04 | 0.04 | 0.04 | 0.04 | 0.04 | 0.04 |
| Dibutyltin dilaurate | 0.10 | 0.10 | 0.10 | 0.10 | 0.10 | 0.10 | 0.10 | 0.10 | 0.10 |
| Trichloropropyl phosphite | 1.50 | 1.50 | 1.50 | 1.50 | 1.50 | 1.50 | 1.50 | 1.50 | 1.50 |
| Lupranat T80 (BASE AG)-Index | 110 | 110 | 110 | 110 | 110 | 110 | 110 | 110 | 110 |
| Density [kg/m$^3$] | 38.9 | 38.7 | 39.6 | 40 | 38.4 | 38.6 | 38.5 | 38.8 | 39.1 |
| Tensile strength [kPa] | 121 | 115 | 115 | 106 | 117 | 117 | 108 | 118 | 119 |
| Elongation [%] | 131 | 124 | 124 | 111 | 125 | 129 | 119 | 125 | 123 |
| Compressive strength 40% [kPa] | 4.1 | 4.3 | 4.7 | 4.6 | 4.4 | 4.4 | 4.4 | 4.3 | 4.3 |
| Compression set [%] | 3.9 | 3.5 | 3.3 | 3.6 | 2.8 | 2.2 | 3.7 | 3.6 | 3.1 |
| Resilience [%] | 63 | 60 | 57 | 54 | 57 | 57 | 59 | 61 | 60 |
| Indentation hardness 25% | 165 | 175 | 189 | 193 | 183 | 178 | 184 | 182 | 184 |
| Indentation hardness 40% | 228 | 233 | 254 | 259 | 245 | 241 | 245 | 241 | 245 |
| Indentation hardness 65% | 423 | 418 | 466 | 481 | 449 | 442 | 450 | 429 | 439 |
| SAG factor | 2.56 | 2.39 | 2.47 | 2.49 | 2.45 | 2.48 | 2.45 | 2.36 | 2.39 |
| HACS [%] | 8.5 | 4.1 | 6.3 | 4.7 | 4.8 | 4.8 | 5.4 | 3.9 | 4.2 |
| WCS [%] | 13.5 | 7.2 | 6.9 | 6.8 | 8.2 | 8.4 | 8.4 | 8.4 | 7.2 |

The amounts of the starting materials are parts by weight.
C—Comparative Experiment
Lupranat® T80—Tolylene diisocyanate 80:20 from BASF AG Determination of the WCS (wet compression set): A foam test specimen is stored for 22 hours at 50° C. and 95% relative humidity and with 70% compression in the compressed state, according to DIN EN ISO 1856, Method C.

HACS (humid aged compression set): A foam test specimen is stored at 120° C. and 100% relative humidity for 5 hours according to DIN EN ISO 2440. The compression set is then measured over a period of 22 hours at 70° C. and 50% compression according to DIN EN ISO 1856, Method A.

SAG Factor:
SAG factor=ILD 65%/ILD 25%
(Quotient of the indentation hardness at 65% deformation divided by the indentation hardness at 25% deformation)
Lupragen® N 206: 70% strength solution of bis(dimethylaminoethyl) ether in dipropylene glycol
Lupragen® N 201: 33% strength solution of triethylenediamine in dipropylene glycol
Tegostab® B 8681: Stabilizer and cell regulator for highly resilient silicone-based foams As shown in table 1, the use of the novel polyol combination (examples 2 to 9) results in a substantial reduction in the wet compression set and in the HACS and the normal compression set. Table 1 furthermore reveals that, with the use of the novel polyol combination, the proportion of diethanolamine can be substantially reduced without there being any significant change in the mechanical properties. What is particularly striking is that the rigidities can be substantially increased by reducing the diethanolamine. The dependence of the rigidities on the proportion of alkanolamine crosslinking agent is illustrated even more clearly in table 3. The stability loss due to the reduction in the diethanolamine can surprisingly be compensated by exchange for polyols (i) 1–8 having a higher functionality, without this leading to a significant deterioration in the tensile strength and elongation.

TABLE 2

| Example | 10 (C) | 11 | 12 | 13 | 14 | 15 | 16 | 17 |
|---|---|---|---|---|---|---|---|---|
| Lupranol ® 4300 | 35.00 | 35 | 35 | 35 | 35 | 35 | 35 | 35 |
| Lupranol ® 2095 | 65.00 | 55 | 55 | 55 | 55 | 55 | 55 | 55 |
| Polyol b1ii1 | | 10 | | | | | | |
| Polyol b2ii2 | | | 10 | | | | | |
| Polyol b2ii3 | | | | 10 | | | | |
| Polyol b2ii4 | | | | | 10 | | | |
| Polyol bsii5 | | | | | | 10 | | |
| Polyol b2ii6 | | | | | | | 10 | |
| Polyol b2ii7 | | | | | | | | 10 |
| Polyol b2ii8 | | | | | | | | 10 |

TABLE 2-continued

| Example | 10 (C) | 11 | 12 | 13 | 14 | 15 | 16 | 17 |
|---|---|---|---|---|---|---|---|---|
| DEOA 85% | 1.50 | 0.80 | 0.80 | 0.80 | 0.80 | 0.80 | 0.80 | 0.80 |
| Water | 2.00 | 2.31 | 2.31 | 2.31 | 2.31 | 2.31 | 2.31 | 2.31 |
| Tegostab ® B 8681 LF (Goldschmidt) | 0.80 | 0.80 | 0.80 | 0.80 | 0.80 | 0.80 | 0.80 | 0.80 |
| Lupragen ® N 201 (BASF AG) | 0.12 | 0.12 | 0.12 | 0.12 | 0.12 | 0.12 | 0.12 | 0.12 |
| Lupragen ® N 206 (BASF AG) | 0.04 | 0.04 | 0.04 | 0.04 | 0.04 | 0.04 | 0.04 | 0.04 |
| Dibutyltin dilaurate | 0.10 | 0.10 | 0.10 | 0.10 | 0.10 | 0.10 | 0.10 | 0.10 |
| Trichloropropyl phosphite | 1.50 | 1.50 | 1.50 | 1.50 | 1.50 | 1.50 | 1.50 | 1.50 |
| Lupranat ® T80 (BASF AG)-Index | 115 | 115 | 115 | 115 | 115 | 115 | 115 | 115 |
| Density [kg/m$^3$] | 37.3 | 35.8 | 36 | 38 | 36.2 | 36.7 | 35 | 34.8 |
| Tensile strength [kPa] | 112 | 107 | 108 | 129 | 127 | 131 | 106 | 98 |
| Elongation [%] | 125 | 118 | 108 | 131 | 122 | 129 | 111 | 105 |
| Compressive strength 40% [kPa] | 4.1 | 4.8 | 5 | 5 | 4.6 | 4.9 | 4.9 | 4.7 |
| Compression set [%] | 3.2 | 3.1 | 4.5 | 4.2 | 3.6 | 3.7 | 3.4 | 4.4 |
| Resilience [%] | 54 | 49 | 47 | 56 | 56 | 56 | 49 | 50 |
| Indentation hardness 25% | 163 | 186 | 192 | 183 | 191 | 197 | 187 | 181 |
| Indentation hardness 40% | 220 | 256 | 265 | 251 | 262 | 265 | 258 | 250 |
| Indentation hardness 65% | 401 | 481 | 499 | 454 | 481 | 480 | 485 | 469 |
| SAG factor | 2.46 | 2.58 | 2.6 | 2.48 | 2.52 | 2.43 | 2.59 | 2.59 |
| HACS [%] | 16.2 | 8 | 11 | 7.2 | 7.7 | 8.1 | 10.7 | 9.9 |
| Wet set [%] | 28.6 | 11.2 | 12 | 11.8 | 12.1 | 9.7 | 12.9 | 12.9 |

As shown in table 2, the use of the novel polyol combination 1–8 (examples 11–17) results in a substantial reduction in the wet compression set and the HACS. Table 2 furthermore reveals that the proportion of diethanolamine can be substantially reduced. The stability loss due to the reduction in the diethanolamine can be compensated by the use of the novel polyol combination without this leading to a significant deterioration in the tensile strength and elongation.

TABLE 3

| Example | 18 | 19 | 20 | 21 |
|---|---|---|---|---|
| Lupranol ® 4300 | 35.00 | 35.00 | 35.00 | 35.00 |
| Lupranol ® 2095 | 55.00 | 55.00 | 55.00 | 55.00 |
| Polyol 2ii1 | 10.00 | 10.00 | 10.00 | 10.00 |
| DEOA 85% | 1.40 | 1.00 | 0.60 | 0.40 |
| Water | 2.10 | 2.10 | 2.10 | 2.10 |
| Tegostab ® B 8681 LF (Goldschmidt) | 0.80 | 0.80 | 0.80 | 0.80 |
| Lupragen ® N 201 (BASF AG) | 0.12 | 0.12 | 0.12 | 0.12 |
| Lupragen ® N 206 (BASF AG) | 0.04 | 0.04 | 0.04 | 0.04 |
| Dibutyltin dilaurate | 0.10 | 0.10 | 0.10 | 0.10 |
| Trichloropropyl phosphite | 1.50 | 1.50 | 1.50 | 1.50 |
| Lupranat ® T80 (BASF AG)-Index | 110 | 110 | 110 | 110 |
| Density [kg/m$^3$] | 37.1 | 37.5 | 37.5 | 39.5 |
| Tensile strength [kPa] | 113 | 121 | 116 | 135 |
| Elongation [%] | 112 | 118 | 132 | 151 |
| Compressive strength 40% [kPa] | 4.2 | 4.7 | 4.7 | 5.3 |
| Compression set [%] | 4.4 | 3.5 | 2.9 | 3.9 |
| Resilience [%] | 54 | 50 | 49 | 49 |
| Wet set [%] | 33 | 27 | 9.5 | 9.6 |

Table 3 shows the effect of the diethanolamine content on the compressive strength of the foams. This decreases substantially with increasing diethanolamine content with a constant content of polyol b2ii1. This decrease in rigidity is due to the effect of the diethanolamine and can be compensated by adding larger amounts of polyol b2ii. Furthermore, the table shows the positive effect of the addition of polyol b2ii in combination with reduced proportions of alkanolamine.

We claim:

1. A process for the preparation of highly resilient polyurethane foams comprising reacting
   a) polyisocyanates with
   b) compounds having at least two hydrogen atoms reactive with isocyanate groups, wherein compounds (b) comprise a mixture containing, based in each case on the weight of the mixture,
       b1) from 5 to 75% by weight of at least one polymer polyol and
       b2) from 25 to 95% by weight of a mixture containing, based in each case on the weight of the mixture b2),
           b2i) from 70 to 98% by weight of at least one polyether alcohol having a molecular weight of from 3500 to 6500 g/mol, a functionality of less than or equal to 3 and an ethylene oxide content of from 8 to 20% by weight, based on the weight of the polyether alcohol, and
           b2ii) from 2 to 30% by weight of at least one polyether alcohol having a molecular weight of from greater than 4000 to 7000 g/mol, a functionality of from 4 to 8 and an ethylene oxide content of from 5 to 15% by weight, based on the weight of the polyether alcohol.

2. A process as claimed in claim 1, wherein the compounds (b) contains alkanolamines in an amount of from 0.2 to 2% by weight, based on the weight of the component b).

3. A processas claimed in claim 2, wherein the alkanolamines are selected from diethanolamine, diisopropanolamine, 3-(2-hydroxyethylamino)-1-propanol, N-(2-aminoethyl)ethanolamine, triisopropanolamine and triethanolamine.

4. A process as claimed in any of claims 1 to 3, wherein the polymer polyols b1) are selected from b1i) dispersion of homo- and/or copolymers of styrene and acrylonitrile in polyols, b1ii) dispersions of polyurea particles in polyols, the polyurea particles being produced by reacting diamines and diisocyanates in the polyols, B1iii) dispersions of particles which are prepared by reacting alkanolamines with diisocyanates in polyols, and mixtures of at least two of said polyols.

5. A process as claimed in claim 1, wherein the polyether alcohols b2ii) are prepared by reacting compounds having at least 4 active hydrogen atoms with alkylene oxides.

6. A process as claimed in claim 1, wherein the polyether alcohols b2ii) are prepared by reacting mixtures of compounds having at least 4 active hydrogen atoms and compounds having less than 4 active hydrogen atoms with alkylene oxides.

7. A process as claimed in claim 1, wherein the polyether alcohols b2ii) are prepared by reacting mixtures of compounds having at least 4 active hydrogen atoms and aliphatic, araliphatic and/or aromatic amines with alkylene oxides.

8. A highly resilient polyurethane foam comprising the reacting product of a) polyisocyanates with b) compounds having at least two hydrogen atoms reactive with isocyanate groups, wherein compounds (b) comprise a mixture containing, based in each case on the weight of the mixture, b1) from 5 to 75% by weight of a polymer polyol and b2) from 25 to 95% by weight of a mixture containing, based in each case on the weight of the mixture b2), b2i) from 70 to 98% by weight of a polyether alcohol having a molecular weight of from 3500 to 6500 g/mol, a functionality of less than or equal to 3 and an ethylene oxide content of from 8 to 20% by weight, based on the weight of the polyether alcohol, and b2ii) from 2 to 30% by weight of a polyether alcohol having a molecular weight of from greater than 4000 to 7000 g/mol, a functionality of from 4 to 8 and an ethylene oxide content of from 5 to 15% by weight, based on the weight of the polyether alcohol.

9. A highly resilient polyurethane foam as claimed in claim 8 and having a value for the humid aged compression set according to DIN EN ISO 2440 and DIN EN ISO 1856, Method A, of less than 15% and a value for the wet compression set according to DIN EN ISO 1856, Method C, of less than 20%.

* * * * *